Dec. 29, 1964     R. McKINVEN, JR     3,163,476
BEARING SEAL AND INSTALLATION
Filed Nov. 13, 1962     2 Sheets-Sheet 2
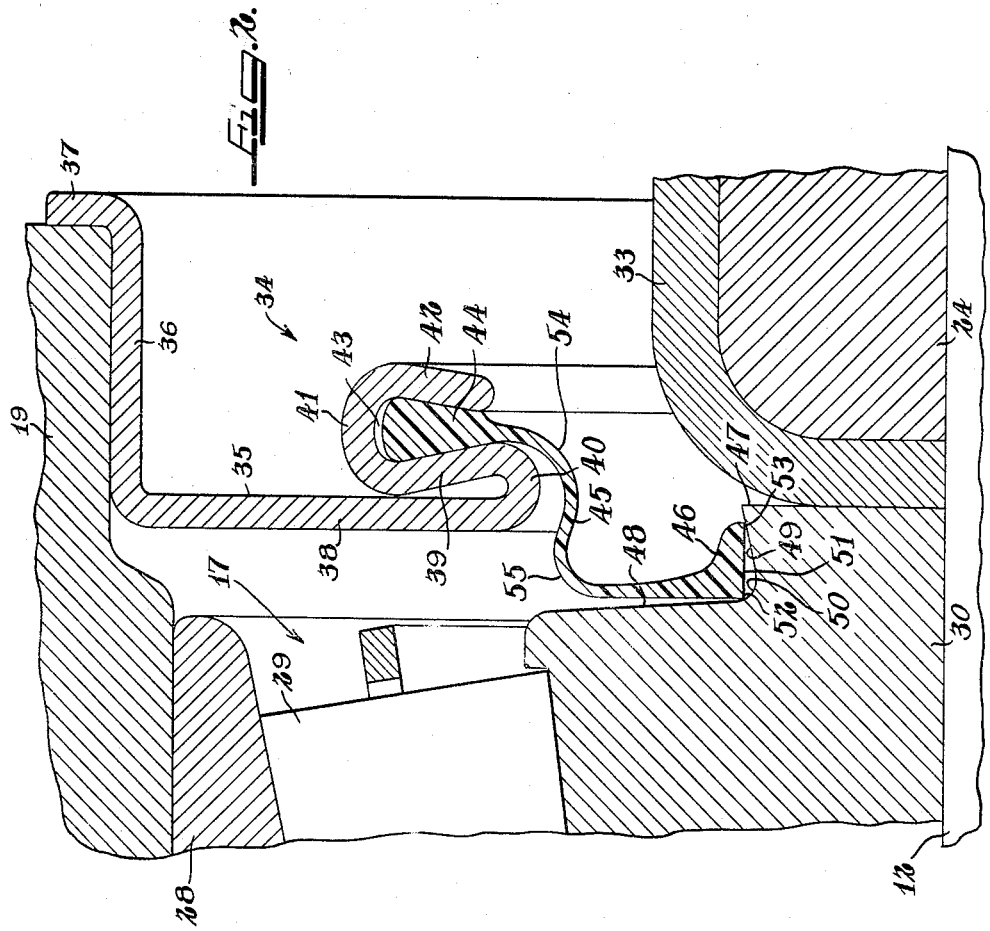
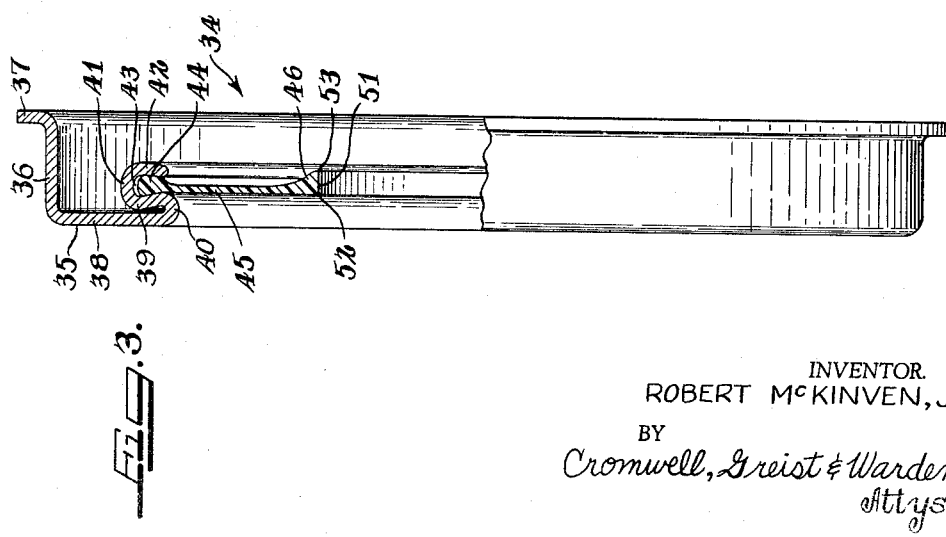
INVENTOR.
ROBERT McKINVEN, JR.
BY
Cromwell, Greist & Warden
Attys.

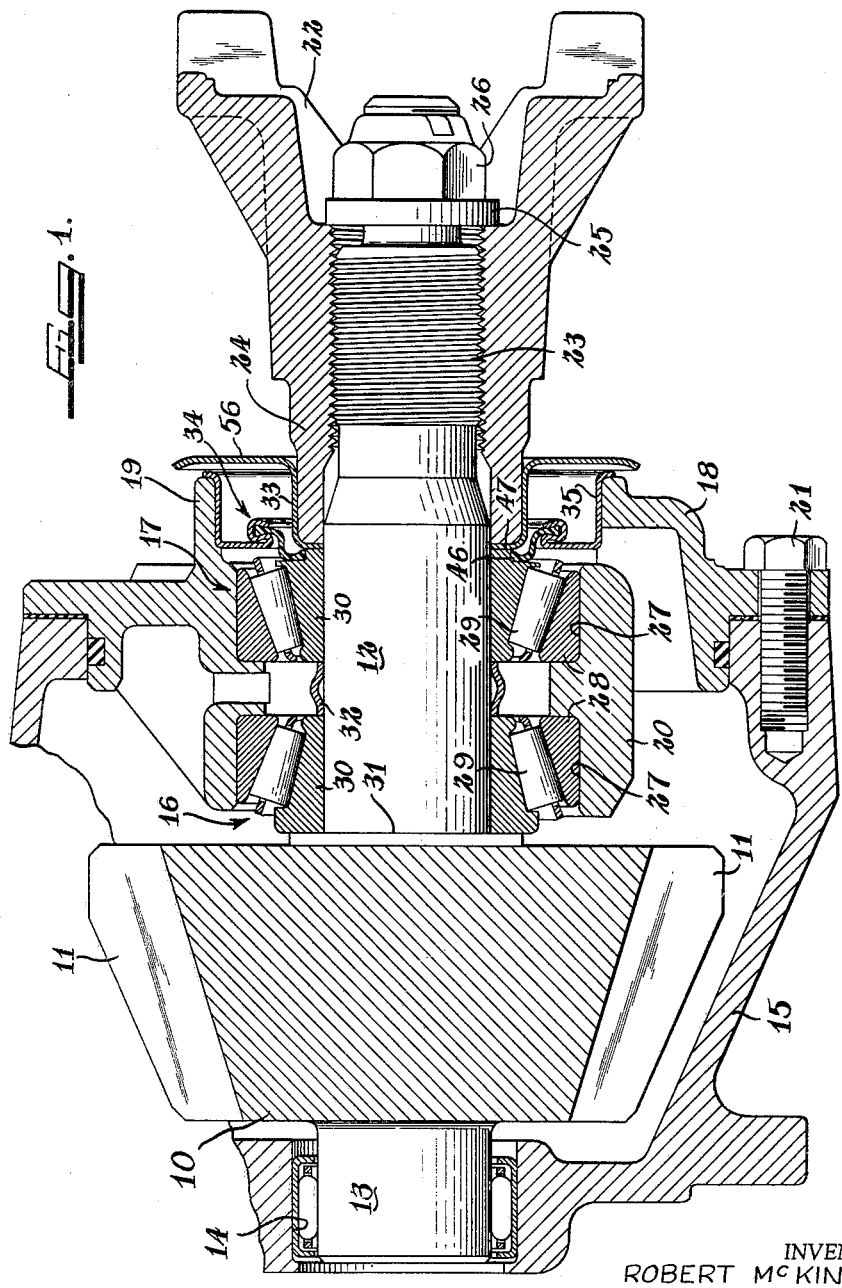

United States Patent Office 3,163,476
Patented Dec. 29, 1964

3,163,476
BEARING SEAL AND INSTALLATION
Robert McKinven, Jr., Detroit, Mich., assignor to Chicago Rawhide Manufacturing Company, Chicago, Ill., a corporation of Illinois
Filed Nov. 13, 1962, Ser. No. 236,810
5 Claims. (Cl. 308—187.1)

This invention relates to a new and improved seal especially adapted for operative mounting across a surface of bearing means to seal the same along a shaft. It is an object of the invention to provide a new and improved radially acting-type seal especially adapted for operative mounting relative to a shaft bearing to seal the same and the shaft associated therewith in a new and improved manner.

A further object is to provide an improved shaft-bearing installation including as a part thereof a seal of unique design and which is operatively mounted in a new and improved manner for efficient sealing action of the bearing and shaft associated therewith.

Still another object is to provide a new and improved form of seal readily adapted for operative mounting with a bearing, as distinguished from a shaft, with minimum change in conventional bearing design.

Another object is to provide a new and improved seal for shaft-bearing apparatus, the sealing being of uncomplicated design and capable of economical fabrication and installation, the design permitting a savings in material used in fabricating the seal while providing unique aspects of sealing operation including ready accommodation of operational eccentricities as well as providing for oil sealing and dirt exclusion.

Other objects not specifically set forth will become apparent from the folowing detailed description of the invention made in conjunction with the accompanying drawings wherein:

FIG. 1 is a fragmentary longitudinal section of a conventional automotive pinion gear assembly illustrating operative mounting of the seal of the invention across the outer end of bearing means forming a part of the assembly;

FIG. 2 is an enlarged half section of the operatively mounted seal illustrating unique operational features thereof; and FIG. 3 is a half sectional side elevation of the seal on reduced scale illustrating the same prior to operative mounting.

Referring to FIG. 1, the typical pinion gear assembly for automotive use comprises a pinion gear 10 provided with peripheral teeth 11 mounted on a shaft portion 12 extending from one end of the gear and a supporting stub shaft portion 13 extending from the other end of the gear. The stub shaft portion 13 is suitably journaled in an opening 14 of a fixed housing 15 with the shaft portion 12 extending through a pair of roller bearing assemblies 16 and 17 suitably mounted in the housing 15. The outer end of the housing is enclosed by a cover plate 18 having as a part thereof an axially outwardly projecting annular flange portion 19 and an inwardly projecting bearing mounting portion 20. The cover plate 18 is suitably fixed to the housing 15 by fasteners 21. A companion flange assembly 22 is received about the outer end of the shaft portion 12 and is fixed thereto for rotation with the shaft portion 12.

The outer end of the shaft portion 12 is formed with an externally threaded attachment portion 23 of reduced diameter. The axially projecting yoke 24 of the companion flange assembly 22 is internally threaded and is received on the shaft portion 12 fixed thereto by engaging faces including a lock ring 25 and lock nut 26 received on the outermost end of the shaft portion.

The bearing mounting portion 20 of the cover plate 18 is of annular shape and includes a pair of axially aligned pockets 27 in which the outer races 28 of the bearing assemblies 16 and 17 are fixed. These bearing assemblies are of conventional design including rollers 29 and inner races 30. The inner races 30 are fixed on the shaft portion 12 for rotation therewith and are held tightly along the shaft portion by abutment of the inner race 30 of the bearing assembly 16 with an annular shoulder 31 forming a part of the gear, an intermediate compression sleeve 32 received about the shaft between the inner races 30, and a combination slinger and compression washer 33 clamped between the inner race 30 of the bearing assembly 17 and the opposed end of the yoke 24 of the companion flange assembly 22. Threaded advancement of the companion flange assembly 22 on the shaft end portion 23 and clamping thereof by the locking elements 25 and 26 provides for axial snugging and clamping of the bearing assemblies 16 and 17 along the shaft portion 12.

Mounted inwardly of the projecting annular portion 19 of the cover plate 18 is the seal 34 of the present invention. The operative mounting of the seal is best shown in FIG. 2, FIG. 3 illustrating the seal in its finished condition prior to operative mounting thereof. The seal 34 includes casing 35 in the form of an annular metal standing or the like provided with an outer peripheral axial leg portion 36 in outer surface frictional engagement with the inner surface of the annular projection 19 of the cover plate 18 and terminating at its outer end in a radially outwardly projecting flange portion 37. This flange portion overextends the outer radial face of the portion 19 of the cover plate to limit the extent to which the seal 34 is received within the cover plate.

The casing 35 further includes a radially inwardly directed leg portion 38 which along its inner periphery is formed with a reversed radially outwardly folded portion 39 connected by an arcuate section 40. The portion 39 is outwardly inclined toward the leg portion 38 and at least virtually abuts the same adjacent the outermost extension of the portion 39, which outermost extension is defined by an axially enlarged arcuate section 41 joining the portion 39 with a second outermost inwardly reversely folded portion 42. The combined portions 39, 41 and 42 co-operatively define therebetween an annular radially opening sealing member attaching groove or channel 43 which is axially backed up by the radial leg portion 38 of the casing 35. The metallic portions defining the channel 43 are readily rolled into position to form the arcuately shaped areas thereof.

The seal 34 also includes a normally flat, annular and flexible sealing member which is of one-piece resinous construction and consists of an enlarged or bulbous outer peripheral portion 44, and intermediate very thin and flexible diaphragm portion 45 of substantial area, and an enlarged inner peripheral portion which is in the form of a substantially L-shaped sealing portion 46 of foot-like configuration. The outer peripheral enlarged portion 44 is continuously clamped in the channel 43 of the casing 35 by rolling of the channel portion 42 thereagainst toward the channel portion 39. Preferably, the sealing member is formed with the enlarged peripheral portion 44 so that substantial material is received in the casing channel 43 and at least substantially fills the same upon compressive clamping thereof. In this manner a complete and highly efficient seal connection is obtained between the casing and sealing member and extrusion of the material of the sealing member, as a result of the casing clamping action, is controllably directed inwardly of the channel 43 by the angle of clamping rolling of the casing portion 42. This avoids extrusion of the sealing member material outwardly of the channel 43 to an extent that complete flexibility of the adjacent diaphragm portion 45 might undesirably be affected. The particular casing configuration is preferred but the invention is not limited thereto, it being understood that other suitable sealing member mounting means may be used. However, this particular form of radial channel casing permits ready fabrication, controlled and efficient clamping of the sealing member for efficient sealing with the casing and prevention of interfering material extrusion, and minimizing of the amount of material necessary to form the sealing member in view of the permissive close association of the casing with the surface to be sealed. An additional advantage arising from the use of the particular casing configuration resides in the provision of arcuately rounded surfaces which aid rather than detract from full flexing of the diaphragm portion 45 of the sealing member.

The inner race 30 of the outermost bearing assembly 17 along its outer radial face portion thereof is formed with an annular projecting nose portion 47. This arrangement defines a generally radial surface 48 joining a generally axial surface 49 to receive the sealing portion 46 thereagainst. The surfaces 48 and 49 are arranged relative to one another preferably at an acute angle and the juncture area 50 therebetween is preferably arcuately recessed. The sealing portion 46 of the sealing member includes a flat outer axial surface 51 which preferably terminates in opposite end right angle configurations defining oppositely acting or directed sealing tips or edge portions 52 and 53.

FIG. 3 illustrates the seal 34 prior to operative mounting thereof. In this condition the sealing member is of flat configuration with the diaphragm portion 45 thereof extending directly radially. Upon operative mounting of the seal 34 the dimensions of the same are such that the sealing portion 46 is substantially radially stretched or expanded to fit over the nose portion 47 of the inner race 30 of the bearing assembly 17. The specific configuration of the sealing portion, including the substantial thickness thereof, permits retention of its basic configuration even in a substantially stretched condition. This constitutes an important aspect of the invention with regard to the particular manner in which the opposite sealing edge portions 52 and 53 establish and maintain running sealing engagement with the surfaces 48 and 49, respectively, of the inner race 30. As shown in FIG. 2, only the portions 52 and 53 engage the surfaces 48 and 49 by reason of the acute angular relation between the surfaces 48 and 49 and the provision of the intermediate radially recessed arcuate area 50. Thus the sealing portion 46 provides the preferred type of sealing lip line contact with the surfaces under seal and yet is of sufficient thickness to permit ready stretching for operative mounting. It is well recognized that sealing action defined by substantially line contact is more efficient than substantial flat surface area contact. This is especially important with regard to the defining of a running seal.

The sealing member of the seal 34 may be formed from any suitable resinous material but is particularly designed for formation from a suitable fluorocarbon, such as polytetrafluoroethylene. The fluorocarbons are particularly useful because of their desirable chemical inertness to corrosive lubricants, their high temperature resistance, their self-lubricating properties, etc. Such materials are well known in connection with their efficient functioning as sealing members. However, these materials exhibit a resilience lag which has limited their application in assemblies subject to eccentric operation. For example, eccentric movement of a shaft against a fluorocarbon sealing lip or edge tends to radially expand the lip and the resiliency of this material is often inadequate to cause the lip to return immediately in adequate shaft-following functioning to prevent leakage.

The particular configuration of the sealing member described permits efficient accommodation of eccentric operation by reason of the sealing portion 46 being enlarged and by reason of the flexible diaphragm portion 45 being quite thin and readily flexible. Expansion of the sealing portion 46 increases the "hoop tension" thereof thus providing sufficient reaction forces in the sealing portion capable of overcoming the resilience lag inherent in the material. Thus the particular manner in which the sealing portion 46 operatively engages the surfaces under seal permits the utilization of substantial material in the formation thereof without interfering with effective sealing and running engagement utilizing sealing edges establishing line contact.

The very thin diaphragm portion 45 permits ready expansion of the sealing portion 46 for operative mounting thereof for the purposes described without adding appreciable sealing pressure to the sealing portion. By this it is meant that the bending stresses created in the diaphragm portion 45 are maintained at a minimum and such stresses do not add to the total amount of torque established between the edge portions 52 and 53 and their respective sealing surfaces. Any appreciable torque increase can interfere with efficient functioning of the seal over an extended period of use. Thus the thin diaphragm portion readily accommodates stretching of the sealing portion to establish adequate hoop tension without adversely affecting the ultimate sealing action of the lips 52 and 53. In this respect it will be realized that the diaphragm portion 45 is substantially flexed, actually being flexed into spaced reversely curved arcuate areas 54 and 55. The flexing is sufficient to an extent that the diaphragm portion at least approaches partial reversing and overlapping of portions thereof. An additional advantage gained from this arrangement is that of providing adequate radial play in the diaphragm portion 45 to accommodate any dynamic eccentricities existing in the installation. Accommodation of eccentricities in this manner does not interfere in any respect with the maintaining of efficient sealing functioning of the sealing portion 46.

The seal 34 by reason of its design and that of the inner race 30 of the bearing assembly 17 may be mounted on the inner race to form a sub-assembly therewith prior to installation of the bearing assembly and seal. In this manner proper operative mounting of the sealing member on the inner race can be readily obtained without the necessity of blind installation. The casing 35 in effect hangs loose from the sub-assembly and, following operative installation of the bearing assembly 17, the casing is friction fitted within the annular portion 19 of the cover plate 18. The combination slinger 33 and companion flange assembly 22 is then operatively mounted on the shaft portion 12 to snug up the various components of the installation about the shaft portion 12. In operation the slinger 33 rotates with the shaft portion 12 relative to the seal 34. The slinger is of known type including a radial flange portion 56 which over-extends the axial opening in the cover plate 18 defined by the annular portion. In this manner a rotating shield is provided to aid in preventing foreign material from contacting the seal 34. However, it will be expected that a certain amount of dirt, mud, water or the like will contact the seal. As a guard against the entry of foreign matter into the installation, the outermost sealing edge 53 functions as a dirt excluded seal. The innermost sealing edge 52 functions as an oil seal, the configuration of the sealing portion 46 being such that the edges 52 and 53 are effective in opposite directions.

A number of advantages arising from the particular seal and installation of this invention have been described. Additional advantages include the feature that the changes necessary in bearing design are maintained at a minimum with the amount of machining of any of the elements of the installation, such as the yoke 24 of the companion flange assembly, being eliminated. By assembling the seal directly to the bearing, the amount of dynamic eccentricity effective on the seal is reduced. The particular manner in which the casing is mounted in the assembly in axially spaced relation from the adjacent end of the bearing assembly 17 readily permits a continuous recirculating flow of oil through the bearing assembly 17 within the housing 15. The special configuration of the sealing member accommodates this spacing arrangement. The use of a bearing seal in this nature eliminates the necessity of installing a shaft through a sealing member which in many cases causes damage to the sealing lip thereof. Expensive machining of a shaft for sealing lip engagement therewith is eliminated by this arrangement.

While the invention has been described in connection with a conventional pinion gear assembly for automotive use, it will be understood that the seal of the invention is adapted for use with any type of installation. Furthermore, while the seal is basically designed for use with a bearing assembly, it will be understood that the seal and the manner in which the same is mounted for running sealing engagement is useful in any environment wherein advantages of the type described above can be realized.

Obviously certain modifications and variations of the invention as hereinbefore set forth may be made without departing from the spirit and scope thereof, and therefore only such limitations should be imposed as are indicated in the appended claims.

I claim:

1. In a seal installation wherein a pair of members are mounted for rotation of at least one of said members relative to the other and bearing means are mounted between said members with respective races fixed thereto, the provision of a seal comprising a casing fixed in said installation relative to one of said members and separate from said races, a flexible diaphragm portion extending radially and axially from said casing and across adjacent ends of said races in endwise sealing relation relative to said bearing means, and an annular sealing portion formed integral with said diaphragm portion and spaced from said casing, said sealing portion being in running sealing engagement with an axially projecting end portion of the one of said races which is the farthest from the area of attachment of said casing in said installation, said diaphragm portion being flexed into axially spaced reversely curved arcuate areas at least tending toward partial reversing and overlapping thereof with the sealing portion thereof being axially offset from said casing and extending substantially radially into engagement with the end portion of said race, said sealing portion being expanded about the end portion of said race and retained thereon.

2. In a seal installation wherein a pair of members are mounted for rotation of at least one of said members relative to the other and bearing means are mounted between said members with respective races fixed thereto, the provision of a seal comprising a casing fixed in said installation relative to one of said members, a flexible diaphragm portion extending from said casing and across adjacent ends of said races in endwise sealing relation relative to said bearing means, and a sealing portion formed integral with said diaphragm portion and spaced from said casing, said sealing portion being in running sealing engagement with an axially projecting end portion of the one of said races which is the farthest from the area of attachment of said casing in said installation, said sealing portion being in the form of an axially extending foot-like projection at the free end of said diaphragm portion and including opposite edge portions in substantially line contact running engagement with the end portion of said one race, said sealing portion being retained on the end portion of said one race in expanded relation thereabout.

3. In a seal installation wherein a pair of members are mounted for rotation of at least one of said members relative to the other and bearing means are mounted between said members with respective races fixed thereto, the provision of a seal comprising a casing fixed in said installation relative to one of said members and separate from said races, a flexible diaphragm portion extending from said casing and across adjacent ends of said races in endwise sealing relation relative to said bearing means, and an annular sealing portion formed integral with said diaphragm portion and spaced from said casing, said sealing portion being in running sealing engagement with an axially projecting end portion of the one of said races which is the farthest from the area of attachment of said casing in said installation, said sealing portion being in the form of an axially extending foot-like projection at the free end of said diaphragm portion and including opposite edge portions in substantially line contact running engagement with the end portion of said one race, said end portion including a sealing surface angled slightly toward the area of said casing and with said sealing portion engaging only spaced portions thereof through said opposite edge portions.

4. In a seal installation wherein a pair of members are mounted for rotation of at least one of said members relative to the other and bearing means are mounted between said members with respective races fixed thereto, the provision of a seal comprising a casing fixed in said installation relative to one of said member and separate from said races, a flexible diaphragm portion extending from said casing and across adjacent ends of said races in endwise sealing relation relative to said bearing means, and an annular sealing portion formed integral with said diaphragm portion and spaced from said casing, said sealing portion being in running sealing engagement with an axially projecting end portion of the one of said races which is the farthest from the area of attachment of said casing in said installation, said sealing portion being in the form of an axially extending foot-like projection at the free end of said diaphragm portion and including opposite edge portions in substantially line contact running engagement with the end portion of said one race, said end portion including a sealing surface angled slightly toward the area of said casing and with said sealing portion engaging only spaced portions thereof through said opposite edge portions, said diaphragm portion being flexed at least toward partial reversing and overlapping thereof with the sealing portion thereof substantially expanded about the end portion of said one race.

5. The seal installation of claim 4 wherein said sealing portion is formed from fluorocarbon material.

References Cited in the file of this patent

UNITED STATES PATENTS

| 1,191,137 | Powers | July 11, 1916 |
| 1,722,478 | Nelson | July 30, 1929 |
| 2,631,071 | Alden | Mar. 10, 1953 |
| 2,639,954 | Potter | May 26, 1953 |
| 2,757,988 | Lecourbe | Aug. 7, 1956 |
| 2,856,246 | Gaubatz | Oct. 14, 1958 |
| 2,893,770 | Poncet | July 7, 1959 |

FOREIGN PATENTS

| 459,104 | Great Britain | Jan. 1, 1937 |
| 1,004,721 | France | Nov. 28, 1951 |